United States Patent
Scarfutti et al.

(10) Patent No.: US 11,055,113 B1
(45) Date of Patent: Jul. 6, 2021

(54) DATA RENDERING FOR APPLICATIONS

(71) Applicant: The Toronto-Dominion Bank, Toronto (CA)

(72) Inventors: Joseph Vincent Scarfutti, Brooklyn, NY (US); Aneesha Suresh Bulchandani, Hoboken, NJ (US); Mark Wei Kuo, Toronto (CA); Elizabeth Rita-Marie Leung, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 16/801,418

(22) Filed: Feb. 26, 2020

(51) Int. Cl.
*G06F 9/451* (2018.01)

(52) U.S. Cl.
CPC .................... *G06F 9/451* (2018.02)

(58) Field of Classification Search
CPC ....................................... G06F 9/451
See application file for complete search history.

(56) References Cited

U.S. PATENT DOCUMENTS 5,790,137 A * 8/1998 Derby ................. G06F 12/0804
                                                        345/537
2020/0195705 A1* 6/2020 Liu ....................... G06F 40/143

OTHER PUBLICATIONS

Qi Zhang; Medical data visual synchronization and information interaction using Internet-based graphics rendering and message-oriented streaming; 14 pages; Oct. 8, 2019 (Year: 2019).*
John Sundell; A first look at the new diffable data sources for tableviews and collection views; 7 pages; archived Dec. 9, 2019 (Year: 2019).*
Eric Bidelman; The WorkersThe Basics of Web Workers; 12 pages; Jul. 26, 2010 (Year: 2010).*
Aziz Khambati; Building an Async React Renderer with Diffingin Web Worker; 32 pages; Sep. 23, 2018 (Year: 2018).*

* cited by examiner

*Primary Examiner* — Doon Y Chow
*Assistant Examiner* — Kimberly L Jordan
(74) *Attorney, Agent, or Firm* — Fish & Richardson P.C.

(57) ABSTRACT

One example method includes receiving, at a client device, an input to present data corresponding to an application. In response to the input, a first user interface for the application is displayed using a web browser on the client device. A streaming data service corresponding to data to be displayed is identified, the streaming data service hosted by a server. A first web worker thread corresponding to the web browser is used to subscribe to the streaming data service. New data corresponding to the streaming data service is obtained using the first web worker thread from the server, and provided to a second web worker thread corresponding to the web browser. The second web worker thread is used to process the new data and prepare for presentation on the first user interface.

20 Claims, 5 Drawing Sheets

DATA RENDERING FOR APPLICATIONS

TECHNICAL FIELD

The present disclosure relates to computer-implemented methods, software, and systems to render data for applications on a user interface displayed on a device.

BACKGROUND

Organizations dealing with large volumes of data often use application platforms to process the data for decision making purposes. In some cases, such an application platform renders, on a user interface (UI) displayed on a computing device, a large volume of data, for example, in the order of millions of data records, some or all of which can be streamed in real-time from a server.

SUMMARY

The present disclosure involves systems, software, and computer-implemented methods related to an application platform that uses web worker threads for processing data, enabling rendering of the data on a device UI and performing complex operations on the data in real-time, without encountering thread blockages due to attendant processor-intensive operations. In some implementations, the application platform is a financial trading platform and the data includes large volumes of trading data, for example, risk and/or profit-loss data, which are exchanged between a server and a client device. One example method includes receiving, at a client device, an input to present data corresponding to an application; in response to the input, displaying, using a web browser on the client device, a first user interface for the application; identifying a streaming data service corresponding to data to be displayed using the first user interface, the streaming data service being hosted by a server that is communicably coupled to the client device; subscribing, using a first web worker thread corresponding to the web browser, to the streaming data service; obtaining, using the first web worker thread from the server, new data corresponding to the streaming data service; providing the new data to a second web worker thread corresponding to the web browser; determining, by the second web worker thread, one or more differences between the new data and previously obtained data presented on the first user interface; storing, by the second web worker thread, the one or more differences in a memory corresponding to the client device; determining status of a buffer time period for storing data for the client device; and upon expiration of the buffer time period, updating, by the second web worker thread, the first user interface using information stored in the memory during the buffer time period, the information including the one or more differences.

Implementations can optionally include one or more of the following features. In some implementations, the method further comprises: receiving, at the client device, a second input associated with a request to provide analytics data; and in response to receiving the second input: performing, by the second web worker thread, one or more tasks corresponding to providing the analytics data; and presenting, by the second web worker thread, results of the one or more tasks on the first user interface in conjunction with presenting data on the first user interface.

In some implementations, displaying the first user interface for the application in response to receiving the input further comprises: in response to receiving the input, executing at least one of the first web worker thread or the second web worker thread to process data for the first user interface.

In some implementations, the method further comprises selecting the buffer time period, including: determining a screen refresh rate of a display screen corresponding to the client device; and in response to determining that a data refresh rate for updating data on the first user interface is slower than the screen refresh rate, selecting the buffer time period to correspond to the data refresh rate.

In some implementations, determining one or more differences between the new data and previously obtained data comprises determining the one or more differences using a data diffing tool. In some implementations, determining the one or more differences using a data diffing tool comprises determining the one or more differences using JavaScript Object Notation (JSON) data diff.

In some implementations, updating the first user interface using information stored in the memory during the buffer time period comprises transmitting a partial update to the first user interface, the partial update corresponding to the one or more differences.

In some implementations, the method further comprises: receiving, at the client device, a second input requesting presentation of second data corresponding to the application; in response to receiving the second input, displaying, using the web browser on the client device, a second user interface for the application; determining a second streaming data service corresponding to the second data, the second streaming data service being hosted by a second server that is communicably coupled to the client device; subscribing, using the first web worker thread, to the second streaming data service; obtaining, using the first web worker thread from the second server, second data corresponding to the second streaming data service; and providing the second data to a third web worker thread corresponding to the web browser, wherein the third web worker thread is for processing the second data for presentation using the second user interface.

In some implementations, processing the second data for presentation using the second user interface comprises: determining, by the third web worker thread, one or more second differences between the second data and data previously presented on the second user interface; storing, by the third web worker thread, the one or more differences in the memory corresponding to the client device; determining status of a current buffer time period for storing data for the client device; and upon expiration of the current buffer time period, updating, by the third web worker thread, the second user interface using information stored in the memory during the current buffer time period, the information including the one or more second differences.

In some implementations, displaying the second user interface for the application in response to the second input further comprises, in response to the second input, executing the third web worker thread to process second data for the second user interface.

In some implementations, the second server is same as the server hosting the streaming data service corresponding to data to be displayed using the first user interface. In some implementations, the second streaming data service is same as the streaming data service corresponding to data to be displayed using the first user interface.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

Like reference numbers in various figures indicate like elements.

DETAILED DESCRIPTION

Organizations that process large volumes of data often use application platforms to visualize the data and use such visualizations for decision making purposes. For example, a financial organization that deals with equities and derivatives, such as an investment bank, can use trading application platforms on a regular basis to make buy and sell decisions. A trading application platform (also referred to interchangeably as a "trading platform") uses a client-server system architecture, executing processes on one or more client devices and one or more servers, facilitating exchange of trading data (e.g. risk and/or profit-loss data) between the components of the system. The trading platform renders, on a UI displayed on a client device, large volumes of trading data, for example, in the order of millions of data records, which can be bi-temporal by nature and can include data streamed in real-time from one or more servers. In some implementations, the UI is a text-based UI, while in some other implementations, the UI is a graphical UI (GUI) presented using a browser application executed by the client device (also referred to as a "client UI" or "client device UI"). Equities and derivatives traders use the data to make informed investment decisions in real time. In addition to streaming data, a trading platform is also configured to generate and display ad hoc analytics to its users on demand, to make investment decisions. As another example, a survey organization can use a statistical analysis platform to process large volumes of polling data, in a manner similar to the above.

The following sections describe the disclosed systems, software, and computer implemented methods with respect to a trading application platform, without loss of generality. However, the disclosed systems, software, and computer implemented methods are also applicable to other types of application platforms.

In some cases, a trading platform uses one or more of the following approaches to render the data on the UI: pagination, in which the trading platform fetches one page of data at a time from a server for display on the client UI; infinite scrolling/virtual rendering, in which the trading platform fetches data from the server as the user scrolls through the data shown on the client UI; client-side model, in which the trading platform fetches all data from the server in one exchange and provides for display on the client UI; and server-side model with lazy loading, in which the trading platform sends each instruction received from the client device, for example, a user input received through the client UI, over to the server.

When pagination or infinite scrolling/virtual rendering is used, some data operations, such as data grouping, may not be supported. In the client-side model, data operations such as grouping, aggregation, or filtering are performed on the client device. Due to limited processing capabilities of a client device, which can be, for example, a laptop, compared to a server, the client-side model can create bottlenecks for processor-intensive operations in some cases. For example, in a single-threaded environment, the processor-intensive operations can block the main thread, causing the client UI to become unresponsive. In the server-side model, processes are executed on the server for data operations such as grouping, aggregation, or filtering. The client UI binds top-level data and as the user expands a given level, data for that level is lazy-loaded. However, the server-side model has an overhead of a round-trip time to the server for fetching data and executing server side functions on every user action, which can be very time-consuming. In some cases, the round-trip time overhead can cause the client UI to be slow to respond to user inputs, leading to a sluggish presentation of the data, which can be disadvantageous for rendering fast-changing data, and performing complex operations (for example, grouping, aggregation, or filtering) on the data in real-time.

The present disclosure describes various techniques related to a trading platform that addresses the issues faced by the traditional approaches, outlined above. The disclosed techniques realize a trading platform that uses web worker threads for processing trading data, enabling rendering of the data on a client device UI and performing complex operations on the data in real-time, without encountering thread blockages due to attendant processor-intensive operations.

In this context, a web worker thread refers to a computational process that is executed from a UI application, such as a browser application, and that runs in the background independently of user-interface scripts that may also have been executed from the same UI application. For example, in some cases, a web worker thread is a JavaScript script executed from a HTML page that runs in the background independently of user-interface scripts (for example, scripts that respond to clicks or other user interactions) that are also executed from the same HTML page. Web worker threads are often able to utilize multi-core processors or central processing units (CPUs) more effectively. In some cases, a web worker thread is a long-running script that is not interrupted by user-interface scripts responding to user activities. Accordingly, a web worker thread can be used to perform a computationally expensive task without interrupting the user interface. In some cases, a web worker thread can be used for data caching, for example, to load and store data.

As described in greater detail below, in some implementations, a trading platform presents a GUI using a browser application on a client device, and executes one or more web worker threads as background processes of the browser application to remain responsive in real-time for display of trading data, while running complex operations in the background. The trading platform employs the web worker threads for various uses. For example, in some implementations, the trading platform uses one or more web worker threads to (i) display real-time risk and profit-loss data on the UI of the client device, or (ii) render ad hoc reports that source data from several data endpoints/collections, or both.

In the following sections, references to a trading platform are meant to include a browser application that is used by the trading platform to present a corresponding trading platform UI. The web worker threads, which are executed within a processing environment of the browser application, are managed by the trading platform.

The disclosed techniques enable a client device to render real-time streaming data on a trading platform UI displayed on the device, concurrently with performing complex operations on the data and display of corresponding analytics, while avoiding (i) display stalling due to CPU-intensive complex operations, and (ii) sluggishness in data refresh due to server round-trip time. In doing so, the performance bottleneck issues that are encountered with the traditional approaches noted above, are avoided. The disclosed techniques allow the trading platform to remain promptly responsive to user inputs, which can facilitate accurate and/or effective decision making by the users of the data.

In some implementations of the present solution, the trading platform executes different types of web worker threads, which include data worker threads and aggregation worker threads. A data worker thread is a web worker thread that is tasked with fetching data from one or more servers and maintaining real-time, or non-real-time data subscriptions. In some implementations, a data worker thread is subscribed to several streams of data and events using a streaming application programming interface (API), for example, a GraphQL subscription API.

An aggregation worker thread is a web worker thread that is tasked with performing CPU intensive computations on streams of data. In some cases, an aggregation worker thread includes a smart data diffing feature, which is used to compare newly-fetched trading data with previously-fetched trading data. Based on the comparison, the aggregation worker thread identifies incremental or delta differences between the two sets of data, and transmits to the UI partial updates that correspond to the delta differences. In such cases, a refresh of the UI is triggered only by changes to data. In some implementations, an aggregation worker thread is used for complex event processing on rapidly changing data. In some implementations, an aggregation worker thread includes logic to perform JavaScript Object Notation (JSON) data diff and transmit data to the UI application as deltas/diffs.

In some implementations, aggregation is triggered against real-time streams of data with a predetermined buffer time, for example, in the order of units or tens of seconds. In some implementations, the buffer time is determined based on the screen refresh rate of the display of the client device. For example, the UI refresh rate is selected to be slower than the screen refresh rate, such that human perception can process the changes in data in a meaningful way.

In some implementations, the trading platform executes multiple instances of data and/or aggregation worker threads, depending on the requirements of the application.

For example, if the demand for streaming data increases beyond a level that can be handled by one data worker thread, one or more additional data worker threads can be spawned. Additionally or alternatively, if the user demand for ad hoc analytics is higher than the level of processing handled by a single aggregation worker thread, the trading platform can spawn one or more additional aggregation worker threads.

Figure 1A:
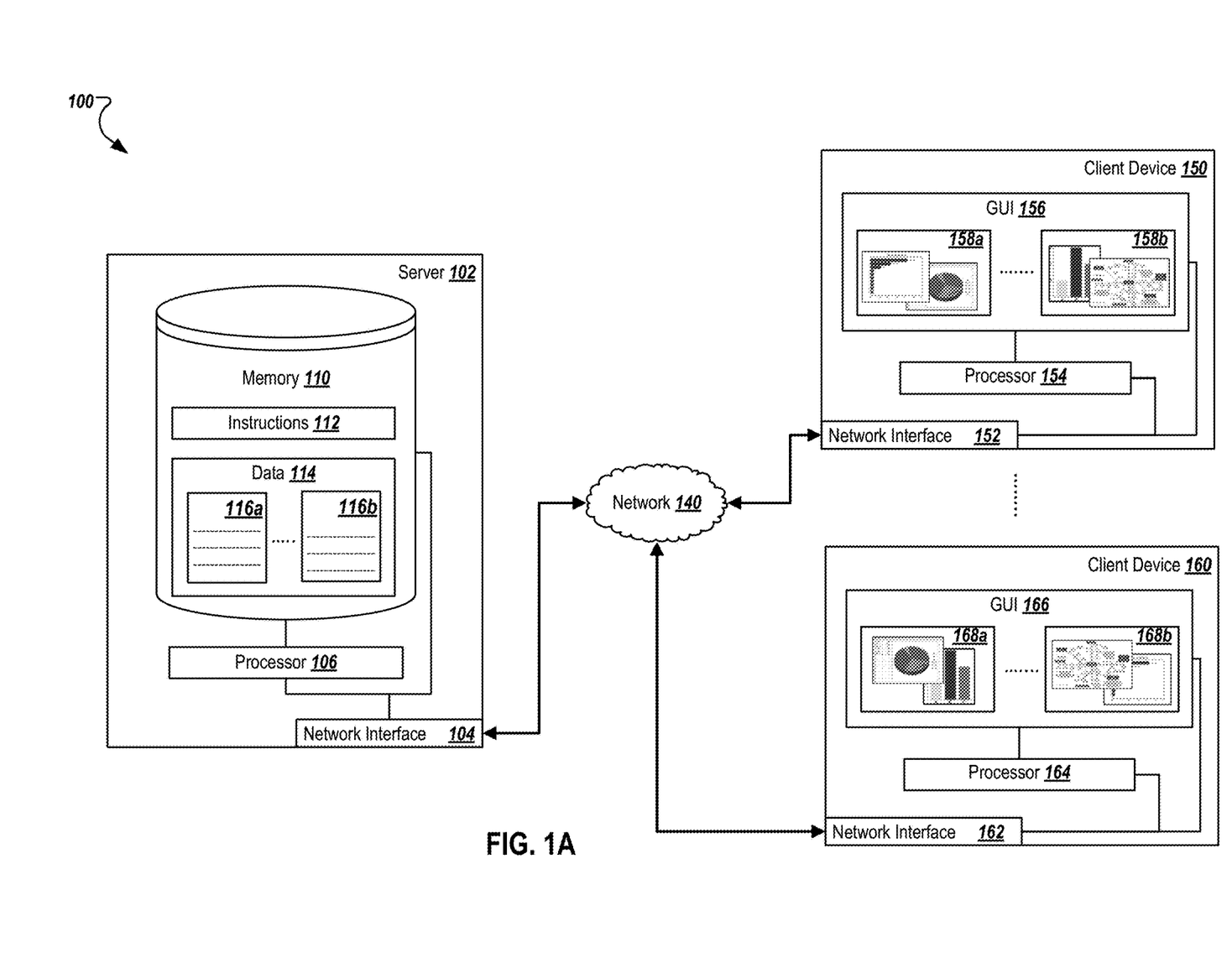
FIGS. 1A and 1B show block diagrams of, respectively, an example system for rendering of application data using web worker threads and a detailed view of web worker threads used for processing application data in a client device in the system.
Figure 1B:
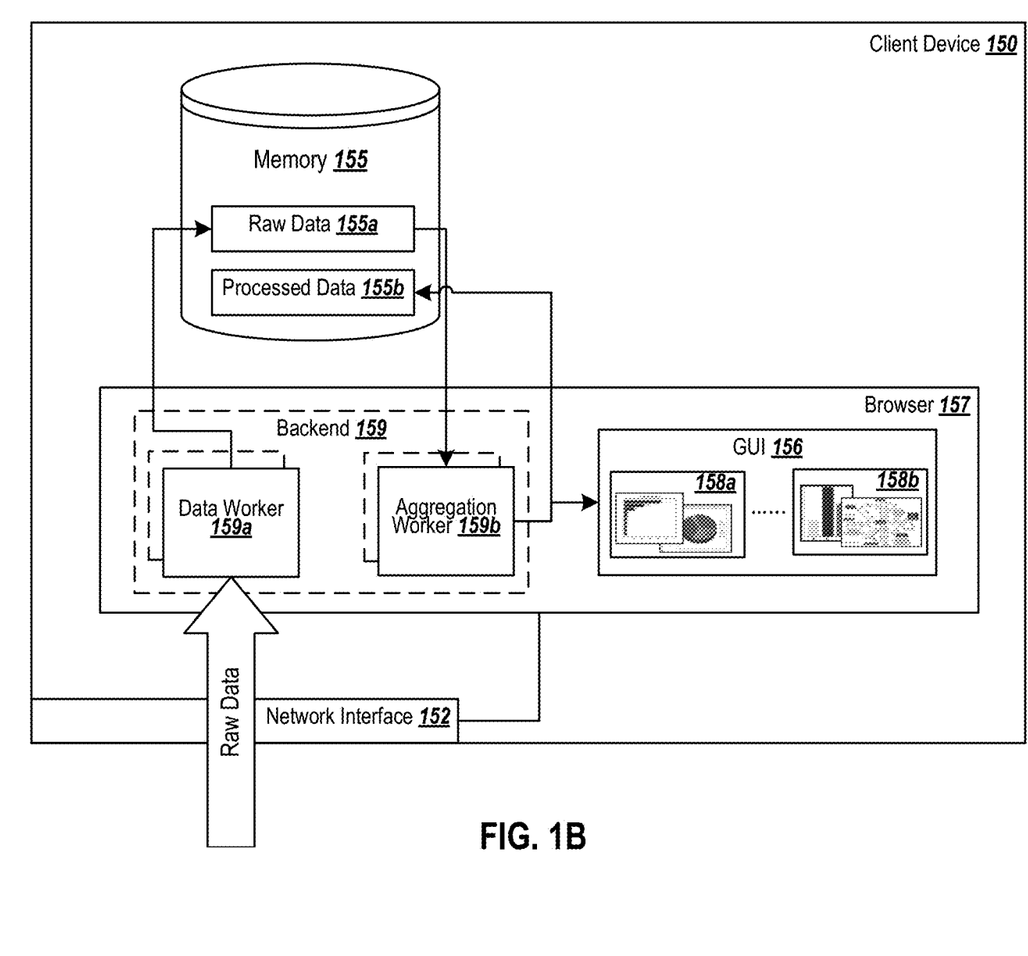

Turning to the illustrated example implementation, FIGS. 1A and 1B show block diagrams of, respectively, an example system 100 for rendering of application data using web worker threads and a detailed view of web worker threads used for processing application data in a client device in the system 100. As shown in FIG. 1A, the system 100 includes server 102, and client devices 150 and 160 that are communicably coupled to the server 102 through a network 140. Although FIG. 1A illustrates two client devices 150 and 160, the system 100 can be implemented using a single client device (for example, one of client device 150 or client device 160), or more than the two client devices that are shown.

In some implementations, the server 102 and the client devices 150 and 160 are associated with (for example, owned or used by) the same organization, and collaborate to process and display, using application platforms running on the client devices, large volumes of data of interest to the organization. For example, in some cases, the organization is a bank or other financial institution. The server 102 obtains and stores trading data, such as risk and/or profit-loss data, from various different data providers, and provides APIs for the client devices to connect to the server to obtain the trading data. A trading platform running on the client device 150 and/or the client device 160 obtains the trading data from the server 102 using the APIs, and presents the data on a user interface of the trading platform displayed on the respective client device. The trading data presented can be in large volumes, for example, millions of records of data, or can be streamed in real-time from the server 102, or both.

In some implementations, the client devices 150 and 160 are associated with a first organization, while the server 102 is associated with a second organization, with the client devices 150, 160 communicating with the server 102 to consume data provided by the server 102. For example, in some cases, the first organization is a bank or other financial institution, while the second organization is a financial data reporting service, from which the first organization obtains trading data. The financial reporting service stores the trading data it generates on the server 102, which are made available to customers of the financial reporting service through network connections established using one or more APIs provided by the server. The client device 150 and/or the client device 160 run a trading platform to present trading data, including trading data that is stored in the server 102. The client devices 150, 160 communicate with the server 102 using the APIs to obtain the trading data for presentation. The trading data presented can be in large volumes, for example, millions of records of data, or can be streamed in real-time from the server 102, or both. The client devices 150 and 160 can be used by the same user, or by different users.

In general, the system 100 allows the illustrated components to share and communicate information across devices and systems (for example, server 102 and client device 150 or client device 160, among others, through network 140). In some instances, the server 102 is a cloud-based component or system that is remotely connected to client devices, such as client devices 150 and 160, through public or private networks or a combination of the two. In some instances, the server 102 is a non-cloud-based component or system that is proximally connected to the client device 150 and/or client device 160, such as in an on-premise system configuration, a client-server application, applications running on one or more client devices, or combinations thereof. Although components are shown individually, in some implementations, functionality of two or more components, systems, or servers may be provided by a single component, system, or server.

As used in the present disclosure, the term "computer" is intended to encompass any suitable processing device. Server 102 and/or client devices 150 and 160 can be any computer or processing device such as, for example, a blade server, general-purpose personal computer (PC), Mac®, workstation, UNIX-based workstation, or any other suitable device. Moreover, although FIG. 1A illustrates a single server 102, the system 100 can be implemented using a plurality of servers, such as a server pool, as well as computers other than servers. In other words, the present disclosure contemplates computers other than general-purpose computers, as well as computers without conventional operating systems. Similarly, the client device 150 or the client device 160, or both, can be any system that can interact with the server 102, receive inputs from users, and display information using one or more GUIs, for example, display trading data on a trading platform UI shown using a web browser on the respective client device. A client device can be a desktop computer, a laptop computer, a television with computer processing capabilities, a smart display device, or a mobile device, such as a smartphone, tablet, smartwatch, portable music player, electronic book reader, or any other suitable mobile computing device. In general, each illustrated component may be adapted to execute any suitable operating system, including Linux, UNIX, Windows, Mac OS®, Java™, Android™, Windows Phone OS, or iOS™, among others. A client device may include one or more specific applications executing on the client device, or the client device may include one or more web browsers or web applications that can interact with particular applications executing remotely from the client device, such as processes executed by the server 102. Moreover, although FIG. 1A illustrates two client devices 150 and 160, the system 100 can be implemented using a single client device (for example, one of client device 150 or client device 160), or more than the two client devices that are shown.

As illustrated, the server 102 includes or is associated with a network interface 104, processor(s) 106, and memory 110. The memory 110 includes instructions 112 that are executed by the processor(s) 106 to perform various operations. The memory 110 also stores data 114, which in some implementations are stored as data records, such as data records 116a and 116b. In some implementations, the data 114 includes financial trading data, such as prices of various securities, financial market news or events, among others. In some implementations, the data 114 includes real-time data, for example, fluctuations in prices of securities during a trading period. In some implementations, the data 114 includes streaming service data that are used by one or more entities associated with the system 100. For example, the data 114 can include financial services data that are used by market traders to make financial decisions. In some implementations, the server 102 obtains the data 114 from one or more streaming services to which the server 102 is connected through the network interface 104 and the network 140. In other implementations, the server 102 hosts one or more streaming services and stores the data for access by client devices that subscribe to the streaming services. In some implementations, the data 114 includes raw data, which correspond to data that has not been processed for presentation to a user on a client device, such as client device 150 and/or client device 160. In some implementations, all or some of the various types of data disclosed above are stored in the server 102 as raw data. In some implementations, all or some of the various types of data disclosed above are stored in the server 102 as processed data.

The network interface 104 is used by the server 102 for communicating with other systems in a distributed environment—including within the system 100—connected to the network 140, for example, the client devices 150 and 160, and other systems communicably coupled to the server 102 and/or network 140. Generally, the network interface 104 comprises logic encoded in software and/or hardware in a suitable combination and operable to communicate with the network 140 and other components. More specifically, the network interface 104 may comprise software supporting one or more communication protocols associated with communications such that the network 140 and/or interface's hardware is operable to communicate physical signals within and outside of the illustrated system 100. Still further, the network interface 104 may allow the server 102 to communicate with the client device 150 and/or client device 160, and others, to obtain and/or provide information regarding trading platforms.

The network 140 facilitates wireless or wireline communications between the components of the system 100 (for example, between the server 102 and the client devices 150 and/or 160), as well as with any other local or remote computers, such as additional client devices, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 can facilitate communications between senders and recipients. In some instances, one or more of the illustrated components (for example, the server 102) may be included within or deployed to network 140 or a portion thereof as one or more cloud-based services or operations. In some instances, the network 140 is all or a portion of an enterprise or secured network, while in another instance, at least a portion of the network 140 represents a connection to the Internet. In some instances, a portion of the network 140 is a virtual private network (VPN). Further, all or a portion of the network 140 can comprise either a wireline or wireless link. Example wireless links may be based on Wi-Fi technologies such as 802.11a/b/g/n/ac/ax, or cellular technologies such as 2G, 3G, WiMAX, LTE, 5G, or 6G, and/or include any other appropriate wireless link. In other words, the network 140 encompasses any internal or external network, networks, sub-network, or combination thereof operable to facilitate communications between various computing components inside and outside the system 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

Although FIG. 1A shows that the server 102 includes a single processor 106, multiple processors may be used according to particular needs, desires, or particular implementations of the system 100. Each processor 106 may be a central processing unit (CPU), an application specific integrated circuit (ASIC), a field-programmable gate array (FPGA), or another suitable component. Each processor 106 may have a single or multiple cores, with each core available to host and execute an individual processing thread. Further, the number of, types of, and particular processors 106 used to execute the operations described herein may be dynamically determined based on a number of requests, interactions, and operations associated with the server 102.

Memory 110 may represent a single memory or multiple memories. The memory 110 may include any memory or database module and may take the form of volatile or non-volatile memory including, without limitation, magnetic media, optical media, random access memory (RAM), read-only memory (ROM), removable media, or any other suitable local or remote memory component. The memory 110 stores various objects or data, including instructions 112, data 114, and any other appropriate information associated with the server 102, including any parameters, variables, algorithms, instructions, rules, constraints, or references thereto. Additionally, the memory 110 may store any other appropriate data, such as VPN applications, firmware logs and policies, firewall policies, a security or access log, print or other reporting files, as well as others. While illustrated within the server 102, memory 110 or any portion thereof, including some or all of the particular illustrated components, may be located remote from the server 102 in some instances, including as a cloud application or repository, or as a separate cloud application or repository when the server 102 itself is a cloud-based system. In some instances, some or all of memory 110 may be located in, associated with, or available through one or more other systems of the associated organization.

The server 102 includes, among other components, several applications, entities, programs, agents, or other software or similar components capable of performing the operations described herein. Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. Each software component may be fully or partially written or described in any appropriate computer language including C, C++, JavaScript, Java™, Visual Basic, assembler, Python, Perl®, XML, any suitable version of 4GL, among others.

One or more client devices 150 and 160 are present in the system 100. Client devices 150 and 160 each includes, among other components, a network interface (respectively, network interfaces 152 and 162) for communication (similar to or different from network interface 104), at least one processor (respectively, processors 154 and 164) (similar to or different from processor 106), and a display that presents a graphical user interface (GUI) (respectively, GUIs 156 and 166). In some instances, each client device 150 and 160 includes an input device, such as a keypad, touch screen, or other input/output mechanisms that enable user interaction with one or more client applications, such as a trading platform front-end user interface displayed on the GUI 156 or GUI 166. A trading platform as used in the system 100 is described in the following sections with respect to the client device 150. However, the description is equally applicable to other client devices in the system 100, such as client device 160.

In some implementations, the client device 150 executes a trading platform, for example, by executing, using the processor 154, instructions corresponding to the trading platform, to present data to user(s) of the client device. The data for the trading platform is presented using a GUI 156, as shown. In some implementations, the data is presented using one or more panels in the GUI 156, such as panels 158a and/or 158b. Each of the panels 158a and 158b can present trading data that has been processed for display on the GUI 156. Some or all of the trading data shown in the various panels can be same or different. Even if the underlying trading data is the same, the format in which the data is presented can be different among panels.

In some implementations, the GUI 156 is presented using an instance of a web browser application executed by the client device 150. For example, in some cases, the GUI 156 is shown using an instance of Google Chrome™ web browser. In other cases, the GUI 156 is shown using one of the web browsers Microsoft Edge™, Internet Explorer™, Apple Safari™, Mozilla Firefox™, Opera™, or another suitable web browser. In such implementations, the one or more panels 158a and 158b are presented using browser windows of the web browser. In some cases, the one or more panels 158a and 158b are presented using different tabs within a single instance of a web browser application running on the client device 150. For example, the panels 158a and 158b can be presented using web browser tabs in a single window of Google Chrome™, Microsoft Edge™, Internet Explorer™, Apple Safari™, Mozilla Firefox™, or Opera™, among other web browsers, where a displayed web browser window corresponds to one running instance of the web browser. In some cases, the one or more panels 158a and 158b are presented using different tabs within different instances of a web browser application running on the client device 150. For example, the panels 158a and 158b can be presented using discrete windows of Google Chrome™, Microsoft Edge™, Internet Explorer™, Apple Safari™, Mozilla Firefox™, or Opera™, among other web browsers. In some cases, the one or more panels 158a and 158b are presented using instances of different web browser applications running on the client device 150. For example, panel 158a can be presented using Google Chrome™, while panel 158b can be presented using one of Microsoft Edge™, Internet Explorer™, Apple Safari™, Mozilla Firefox™, or Opera™ among other web browsers.

In some implementations, the panels 158a and/or 158b provide real-time visualizations of trading data, such as price fluctuations of various securities as they are being traded in the financial markets. In some implementations, the trading platform subscribes to various data streams as requested by a user of the client device, and presents the data for the subscribed streams as the data is received at the client device 150. As described above, in some implementations, the trading platform uses one or more data worker threads executed within the browser application runtime environment to fetch the data for display. In some cases, the trading platform uses the data worker threads to fetch the data from the server 102, connected through the network interface 152 and the network 140.

In some implementations, input options are provided with the panels 158a and/or 158b, which allow a user to interact with the trading platform. For example, a user can provide an input requesting data analysis, or presentation in a particular format. The trading platform uses one or more aggregation worker threads executed within the browser application runtime environment to process the data for display, for example, presenting the data in the requested format and/or presenting requested data analytics information.

FIG. 1B provides greater detail about data worker and aggregation worker threads executed in the web browser runtime environment on the client device 150 that perform operations of the trading platform to present data on the GUI 156 in some implementations. As shown, and discussed above, in some implementations, the trading platform uses a web browser application 157 running on the client device 150 to present the trading data. When the trading platform is executed on the client device 150, and the corresponding GUI 156 is launched using the browser 157, one or more data worker threads 159*a* and one or more aggregation worker threads 159*b* are launched in the backend processes 159 of the browser 157, executed within the runtime environment of the browser.

In some implementations, for every panel that is shown in the GUI 156, at least one dedicated data worker thread and/or at least one dedicated aggregation worker thread is launched. For example, in such implementations, the trading platform executes a data worker thread 159*a* and an aggregation worker thread 159*b* to obtain and present data for the panel 158*a*, and further executes a different data worker thread 159*a* and a different aggregation worker thread 159*b* to obtain and present data for the panel 158*b*. The dedicated data worker threads fetch data for the respective panels, and the dedicated aggregation worker threads process and prepare the data for presentation specific to the respective panel.

In some implementations, one or more data worker threads are shared among multiple panels shown in the GUI 156, while each panel has at least one dedicated aggregation worker thread. For example, in such implementations, the trading platform executes a data worker thread 159*a* and an aggregation worker thread 159*b* to obtain and present data for the panel 158*a*. However, the trading platform executes different aggregation worker threads 159*b* to obtain and present data for the panels 158*b*. The common data worker thread fetches data for both panels, while the dedicated aggregation worker threads process and prepare the data for presentation specific to the respective panel.

In some implementations, one or more aggregation worker threads are shared among multiple panels shown in the GUI 156, while each panel has at least one dedicated data worker thread. For example, in such implementations, the trading platform executes different data worker threads 159*a* for the panels 158*a* and 158*b*, while both panels share a common aggregation worker thread 159*b*. The different data worker threads fetch data for their respective panels, while the common aggregation worker thread processes and prepares the data for presentation for both panels.

To describe the functionalities of a data worker thread 159*a* and an aggregation worker thread 159*b* in one illustrative implementation, the data worker thread 159*a* fetches data from a server for display on the GUI 156 (for example, using one or more of the panels 158*a* and 158*b*) and maintains real-time or non-real-time data subscriptions. For example, the data worker thread 159*a* fetches raw data, such as one or more records 116*a* and 116*b*, from the server 102 over the network 140. In some implementations, the data worker thread 159*a* subscribes to several streams of data and events made available by the server 102, using a streaming API, for example, a GraphQL subscription API. The data worker thread 159*a* stores the fetched data as raw data 155*a* in the memory of the client device 150, for example, memory 155. In some implementations, the memory 155 is of a type similar to the memory 110 of the server 102.

In some implementations, the data worker thread 159*a* triggers the aggregation worker thread 159*b* upon fetching and storing the raw data 155*a*. In some implementations, the trading platform triggers the aggregation worker thread 159*b* following storage of the raw data 155*a* by the data worker thread 159*a*.

The aggregation worker thread 159*b* accesses the raw data 155*a* from the memory 155, and processes the raw data for presentation on the GUI 156. The processing can include, for example, preparing the data in a format requested for presentation on a panel, for example, one of panels 158*a* and 158*b*, or analyzing the raw data and preparing analytics reports for presentation on a panel, for example, one of panels 158*a* and 158*b*, among other suitable functions. Following processing by the aggregation worker thread 159*b*, the information is sent to the GUI 156 for presentation, and/or stored in the memory as processed data 155*b*. The information sent to the GUI 156, or the processed data 155*b*, or both, can include, for example, the raw data converted into a suitable presentation format, or analytics reports on the data, among others. Upon receiving the processed data from the aggregation worker thread 159*b*, the GUI 156 refreshes the displayed information, for example, by updating the data presented on one or more of the panels 158*a* or 158*b*.

In some implementations, the processing includes performing data diffs. In such implementations, the aggregation worker thread 159*b* includes a smart data diffing feature, which is used to compare newly-fetched data with previously-fetched data. For example, the aggregation worker thread 159*b* can perform JavaScript Object Notation (JSON) data diff. Based on the comparison, the aggregation worker thread 159*b* identifies delta differences between the two sets of data. The aggregation worker thread 159*b* transmits to the GUI 156 partial updates that correspond to the delta differences. In such cases, only changes to the data trigger a refresh of the information presented by the GUI 156. In some implementations, the aggregation worker thread 159*b* also stores the delta differences as incremental updates to an original set of base processed data 155*b*.

In some implementations, the raw data 155*a* is buffered or stored in the memory 155 with a predetermined time period before the data is processed by the aggregation worker thread 159*b* and displayed on the GUI 156. In some other implementations, the raw data 155*a* is processed by the aggregation worker thread 159*b* without a buffer delay following receipt and storage by the data worker thread 159*a*. However, the aggregation worker thread 159*b* buffers the processed data 155*b* for a predetermined time period before the data is sent to the GUI 156 for display. The predetermined time period can be, for example, in the order of units or tens of seconds.

In some cases, the buffer time period is determined based on the screen refresh rate of the client device display. For example, the refresh rate of the information presented by the GUI 156 is selected to be slower than the refresh rate of the display screen of the client device 150, such that human perception can process the changes in data in a meaningful way.

In some implementations, the trading platform executes multiple instances of data worker threads 159*a* or aggregation worker threads 159*b*, or both. For example, in some cases, a user can subscribe to a large number of data streams, such that the demand for streaming data increases beyond the processing capability of an individual data worker thread. In such cases, the trading platform can spawn one or more additional data worker threads, and distribute the load to fetch and store data among the different data worker threads. Additionally or alternatively, in some cases, the user can request ad hoc analytics information on a large number of parameters or metrics related to the raw data, such that the demand for ad hoc analytics is higher than the processing capability of one individual aggregation worker thread that is in service. In such cases, the trading platform can spawn one or more additional aggregation worker threads, and distribute the data processing load among the different aggregation worker threads.

While portions of the elements illustrated in FIGS. 1A and 1B are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2A:
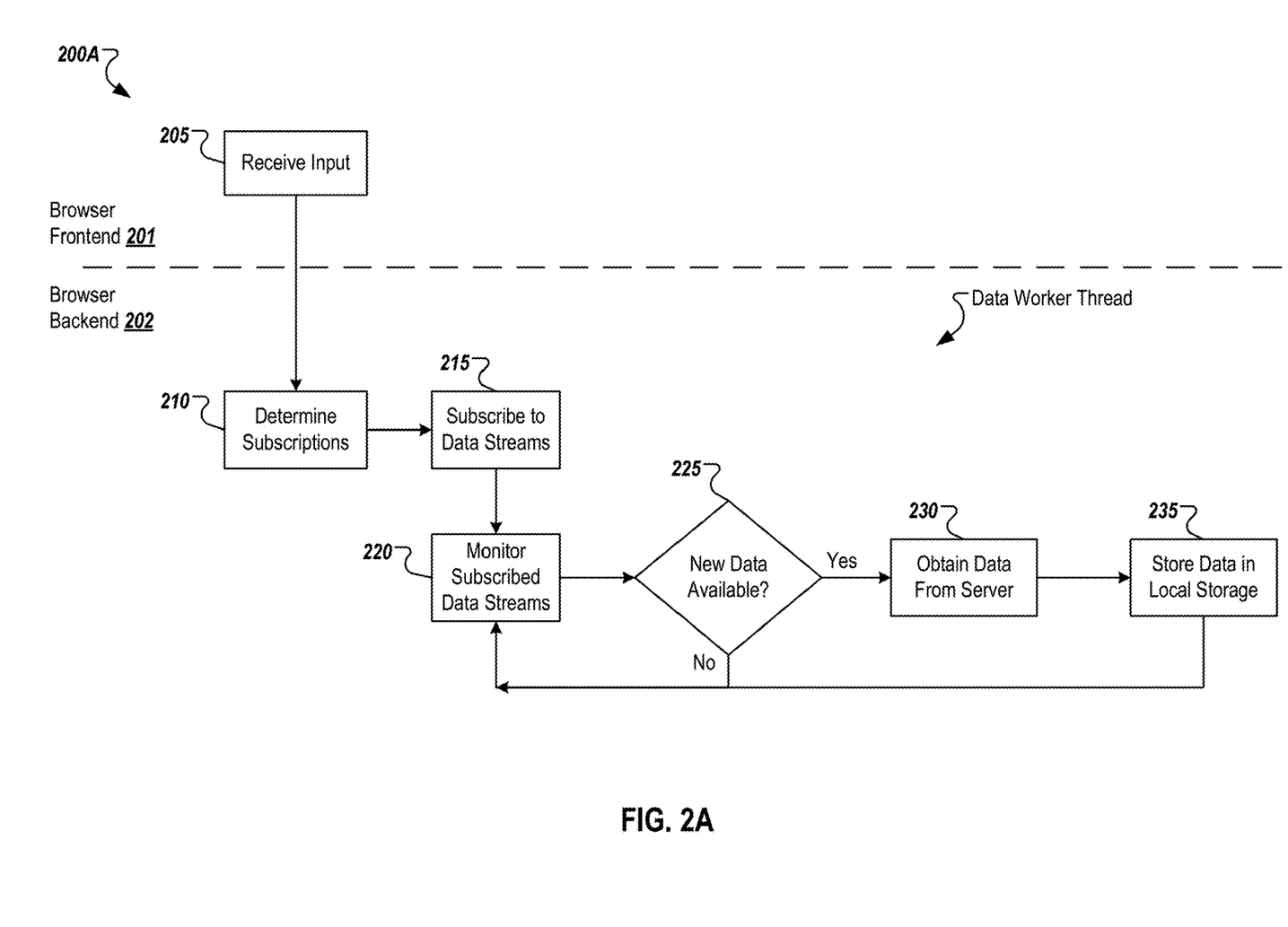
FIGS. 2A and 2B are flow chart diagrams of processes showing examples of operational flows of a data worker thread and an aggregation worker thread.
Figure 2B:
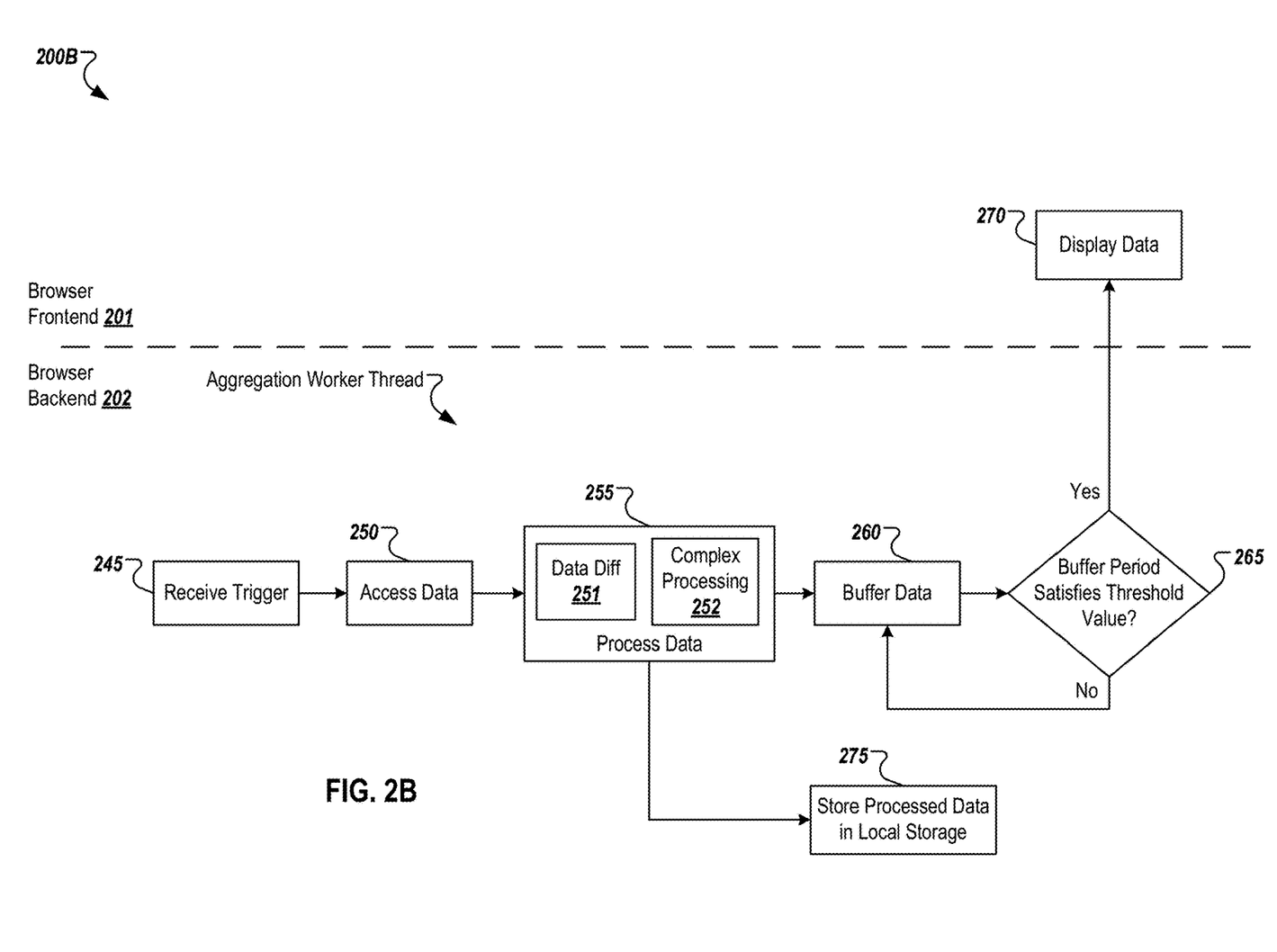

FIGS. 2A and 2B are flow chart diagrams of processes 200A and 200B, respectively, showing examples of operational flows of a data worker thread and an aggregation worker thread. Process 200A shown in FIG. 2A provides an example flow of operations performed by a data worker thread, executed in a browser backend processing environment 202, and corresponding interactions with the browser frontend 201, to fetch and store raw data for a trading platform. Process 200B of FIG. 2B provides an example flow of operations performed by an aggregation worker thread, executed in the browser backend processing environment 202, and corresponding interactions with the browser frontend 201, to process raw data for presentation on a GUI of the trading platform.

In some implementations, the browser backend 202 and the browser frontend 201 are respectively similar to the backend 159 and the GUI 156 of the browser 157 discussed with respect to the system 100. In such implementations, the data worker thread corresponding to the process 200A is an instance of the data worker thread 159a, while the aggregation worker thread corresponding to the process 200B is an instance of the aggregation worker thread 159b.

As shown in FIG. 2A, in the process 200A, an input is received through the browser frontend 201 (205). For example, in some implementations, the input corresponds to an initial execution of the trading platform, for example, when a user of the client device 150 runs the trading platform, launching the GUI 156 of the trading platform using the browser 157. In some implementations, the input is received when the trading platform is already running. For example, a user of the client device 150 provides an input through the GUI 156 to access new trading data, such as upon subscribing to a new data stream.

Upon receiving the input (205), a data worker thread in the browser backend 202 determines subscriptions (210). For example, when the input is an initial launch of the trading platform in some implementations, then the trading platform executes a new data worker thread 159a in the runtime environment of the browser 157, and the data worker thread 159a determines new data subscriptions or existing data subscriptions (for example, from a previous session of the trading platform) for the trading platform upon launch. In some implementations where the trading platform is already running, with a data worker thread 159a being executed in the backend 202, when the input is to access new trading data, the data worker thread determines a new data subscription corresponding to the new data access request.

After determining the streaming data subscriptions for the presently running instance of the trading platform, the data worker thread subscribes to the data streams (215). For example, the data worker thread 159a connects to the server 102 through the network 140, where the server 102 is acting as a repository for the streaming data. The data worker thread subscribes to one or more streams of interest made available by the server, for example, using a streaming API, such as a GraphQL subscription API.

The data worker thread monitors the subscribed data streams (220). For example, the data worker thread 159a periodically queries the server 102 to determine if new data is available at the server for the one or more streaming data services that the data worker thread 159a has subscribed to. If the data worker thread determines that there is new data available (225), for example, upon an indication from the server 102, then the data worker thread obtains the data from the server 102 (230) and stores the data in local storage (235). For example, when there is new data available at the server 102, such as one more new data records 116a or 116b, the data worker thread 159a obtains the data from the server 102 and stores the data in memory 155. As described previously, in some implementations, the data in the server 102 is raw data, which is stored as raw data 155a. In some implementations, the data worker thread pulls the new data from the server 102, while in other implementations, the server 102 pushes the new data to the client device 150, for reception by the data worker thread 159a.

As described previously, after the data worker thread obtains the new data from the server, the aggregation worker thread processes the data. As shown in FIG. 2B, in the process 200B, the aggregation worker thread processes the data upon receiving a trigger (245). For example, in some implementations, the data worker thread 159a triggers a corresponding aggregation worker thread 159b after storing the raw data 155a in the memory 155. In some other implementations, the trading platform triggers an aggregation worker thread 159b after the data worker thread 159a has stored the raw data 155a.

In some implementations, the aggregation worker thread is triggered after a predetermined delay period following reception of the data and storage in the memory 110. For example, in some cases, the trading platform determines a buffer time based on the screen refresh rate of the client device display. In some cases, the aggregation worker thread is triggered data after expiration of a buffer time period following storage of new data in the memory by the data worker thread.

In some implementations, an aggregation worker thread is triggered upon receiving a user input from the browser frontend 201. For example, a user of the client device 150 may provide an input through the panel 158a, requesting ad hoc analytics. Upon receiving the input, the aggregation worker thread 159b that is servicing the panel 158a is triggered to process the data corresponding to the panel 158a, and generate the requested analytics information.

Following the trigger, and with or without a finite buffer time period delay, the aggregation worker thread accesses the data (250) for processing. For example, an aggregation worker thread 159b accesses the raw data 155a, corresponding to the particular panel of the GUI that is serviced by the aggregation worker thread, from the memory 155.

Upon accessing the data, the aggregation worker thread processes the data (255). For example, in some implementations, an aggregation worker thread 159b processes the raw data 155a to be presented in a particular format that is specified for the panel serviced by the aggregation worker thread. In some implementations, an aggregation worker thread 159b performs a data diff (251) on the raw data 155a, in which the aggregation worker thread compares newly-fetched data with previously-fetched data that is displayed using the GUI 56, and identifies delta differences between the two sets of data. In some implementations, an aggregation worker thread performs complex processing (252) on the raw data 155a. For example, upon receiving a user input requesting ad hoc analytics, an aggregation worker thread performs corresponding analytics operations on the raw data 155a, such as different kinds of statistical analyses. In some implementations, an aggregation worker thread performs data diff concurrently with the complex processing.

Once the raw data is processed and prepared for presentation, the aggregation worker thread proceeds to send the data to the browser frontend 201 for displaying the processed data (270). For example, an aggregation worker thread 159b sends the prepared data to the particular panel serviced by the thread, such as one of panels 158a or 158b. However, in some implementations, after preparing the data, the aggregation worker thread buffers the data (260) for a predetermined time period, and sends the prepared data to the display when the buffer time period satisfies a threshold value (265). For example, as described previously, in some implementations, the threshold value corresponds to the screen refresh rate of the display of the client device. The prepared data is buffered until the buffer time period is greater than or equal to the screen refresh rate, when the data is sent to the frontend for display (270). In doing so, the rate at which the trading platform GUI is refreshed is slower than the screen refresh rate of the device display, such that human perception can process the changes in data presented in the GUI in a meaningful way.

In some implementations, the data is buffered with a delay period either before triggering the aggregation worker thread, or after the data has been processed by the aggregation worker thread, but not both. For example, in some implementations, the aggregation worker thread is triggered after a delay corresponding to the predetermined time period following storage of raw data by the data worker thread. In such implementations, the data prepared by the aggregation worker thread is sent to the frontend GUI for display without any further buffering delay. In other implementations, the aggregation worker thread is triggered without any delay following storage of raw data by the data worker thread. In such implementations, the data prepared by the aggregation worker thread is buffered for the predetermined time period and then sent to the frontend GUI for display.

In some implementations, the data is buffered with a delay period both before triggering the aggregation worker thread and after the data has been processed by the aggregation worker thread. In such implementations, the aggregation worker thread is triggered after a first delay period following storage of raw data by the data worker thread. The data prepared by the aggregation worker thread is buffered for a second delay period and then sent to the frontend GUI for display. In such implementations, the total delay due to the first delay period and the second delay period is equal to the predetermined time period corresponding to the screen refresh rate of the device display. In this manner, various implementations ensure that the data is displayed at a rate that is based on the screen refresh rate of the device display, but additional buffer delay is not encountered, such that the trading platform performance is not adversely affected.

In some implementations, the aggregation worker thread stores the processed data in local storage (275). For example, in some implementations after processing and preparing the raw data for presentation, an aggregation worker thread 159b stores the processed data 155b in the memory 155. In some implementations, storage of data in the local storage is performed concurrently with sending the data to the frontend for display. In some implementations, the data buffering (260) is a part of storing the processed data in local storage. In such cases, after the aggregation worker thread processed the raw data and prepares for presentation (255), the aggregation worker thread sends the processed data to local storage (275) and tracks the predetermined buffer time period. When the buffer time period satisfies the threshold value (265), the aggregation worker thread accesses the processed data from the local storage and sends to the frontend 201 for display (270).

Figure 3:
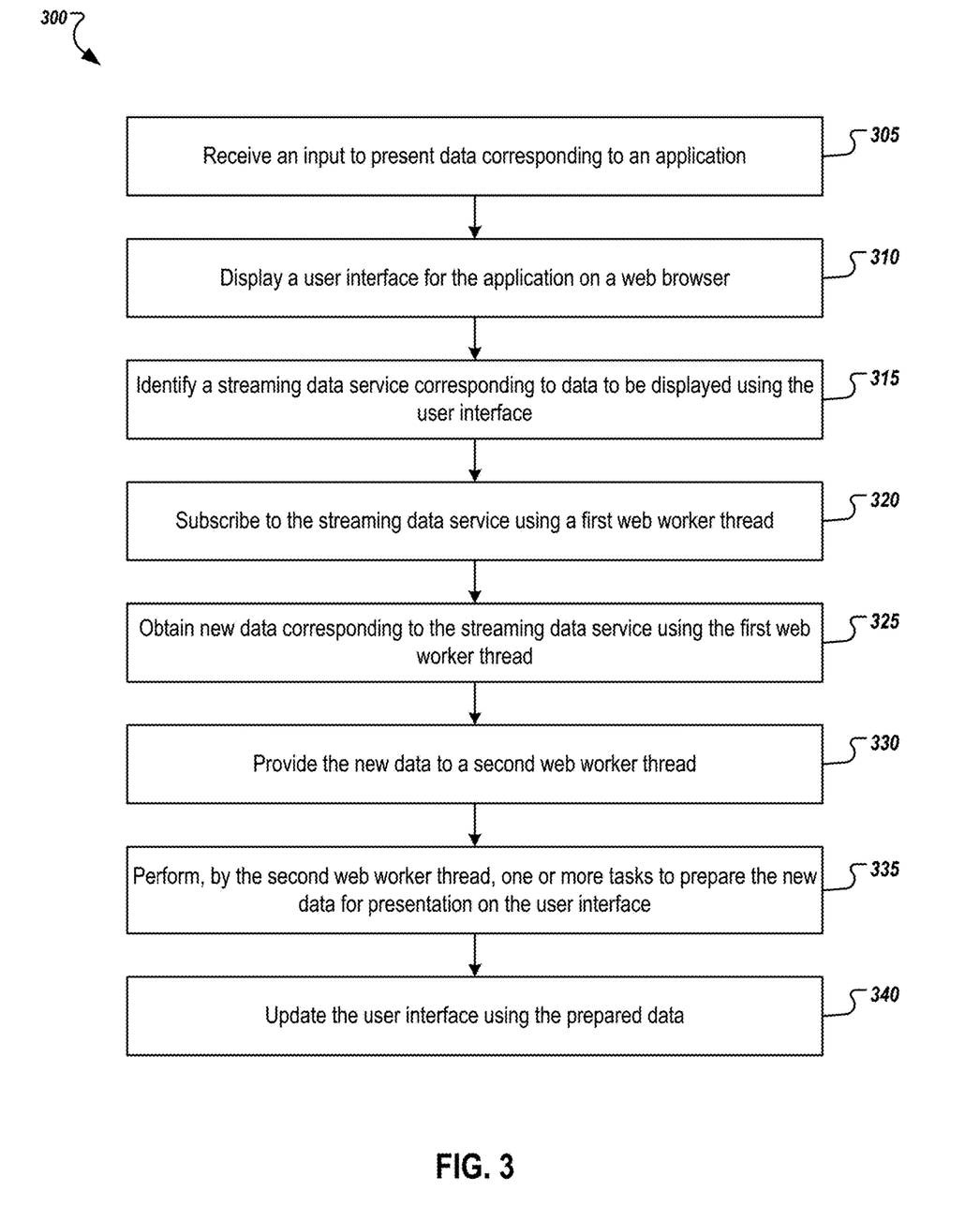
FIG. 3 is a flow chart diagram of an example method for data rendering for applications in one example implementation.

FIG. 3 is a flow chart diagram of an example method 300 for data rendering for applications in one example implementation. For clarity of presentation, the description that follows generally describes method 300 in the context of the system 100 illustrated in FIGS. 1A and 1B. However, it will be understood that method 300 may be performed, for example, by any other suitable system, environment, software, and hardware, or a combination of systems, environments, software, and hardware as appropriate. In some instances, method 300 can be performed by the server 102 and/or the client device 150 or the client device 160, or portions thereof, described in FIGS. 1A and 1B, as well as other components or functionality described in other portions of this description.

The method 300 starts by receiving an input to present data corresponding to an application (305). For example, in some implementations, the processor 154 of the client device 150 determines reception of an input through an input/output interface of the client device to run the trading platform on the client device. As another example, in some implementations, when the trading platform is already running with the corresponding GUI 156, the trading platform (that is, instructions corresponding to the trading platform that are executed by the processor 154) determines reception of an input, through an input option provided using the GUI 156, to present new trading data in an existing panel or a new panel, for example, by subscribing to a new data stream, or to present ad hoc analytics.

Upon receiving an input to present data corresponding to an application, a user interface for the application is displayed on a web browser (310). For example, when the processor 154 of the client device determines reception of the input to run the trading platform, the processor 154 executes instructions to launch the trading platform, including presenting GUI 156 corresponding to the trading platform using a window (or a tab in a window) of the browser 157. As another example, when the trading platform is running and an input is received to present data in a new panel, the trading platform launches a new panel in the GUI 156.

The method 300 continues by identifying a streaming data service corresponding to data to be displayed using the user interface (315). For example, the trading platform determines a streaming service, such as a financial data provider service, from which trading data is to be obtained and displayed on the GUI 156, or a panel of the GUI 156, as applicable.

The method 300 continues by subscribing to the streaming data service using a first web worker thread (320). For example, when the trading platform is launched and a GUI 156 corresponding to the trading platform is displayed using the browser 157, the trading platform executes a data worker thread, such as data worker thread 159a, in the background within the runtime environment of the web browser 157, and uses the data worker thread to subscribe to one or more streaming services from which trading data is obtained to display on the GUI 156. The data worker thread 159a communicates with the server 102 over the network 140, and subscribes to the target streaming services that are made available by the server 102.

The method 300 continues by obtaining new data corresponding to the streaming data service using the first web worker thread (325). For example, the data worker thread 159a communicates with the server 102 over the network 140, and obtains the data 114 that is stored in the server 102, as described in the previous sections.

The method 300 continues by providing the new data to a second web worker thread (330). For example, when the trading platform is launched, the trading platform executes in addition to a data worker thread, an aggregation worker thread, such as aggregation worker thread 159b, in the background within the runtime environment of the web browser 157, and uses the aggregation worker thread to process the trading data obtained from the server 102 by the data worker thread. In some implementations, the data worker thread 159a stores the trading data that it obtains in the memory of the client device 150, for example, as raw data 155a in memory 155, and the aggregation worker thread 159b is triggered when new raw data 155a is available. In some implementations, as described previously, there is a delay of a predetermined time period between storage of the raw data 155a and triggering the aggregation worker thread 159b, where the predetermined time period is selected based on the screen refresh rate of the display of the client device 150. In other implementations, the aggregation worker thread 159b is triggered without a delay period following storage of the raw data 155a by the data worker thread 159a.

The method 300 continues by performing, by the second web worker thread, one or more tasks to prepare the new data for presentation on the user interface (335). For example, the aggregation worker thread 159b obtains the raw data 155a from the memory 155 and processes the raw data for presentation on the GUI 156. As described previously, the processing can include one or more of updating the presentation format of the raw data, performing a data diff on the raw data to determine delta differences with the trading data that is already displayed, or performing analytics operations on the raw data, or any other suitable operation performed by the trading platform for presenting trading data on the GUI 156.

The method 300 continues by updating the user interface using the prepared data (340). For example, the aggregation worker thread 159b generates processed data upon processing the raw data 155a, as described above. The aggregation worker thread 159b sends the processed data to the GUI 156 for presentation on the display of the client device 150, for example, using one of the panels 158a or 158b that is serviced by the aggregation worker thread 159b. In some implementations, the aggregation worker thread 159b also stores the processed data in the memory 155, for example, as processed data 155b. For example, upon performing data diff on the raw data as discussed above, the determined delta differences are stored in the memory 155. In some implementations, as described previously, the aggregation worker thread 159b buffers the processed data for a predetermined time period before the data is sent to the GUI 156 for display.

In such implementations, the aggregation worker thread 159b monitors the predetermined time period, and sends the data to the frontend for display upon expiration of the predetermined time period. As noted previously, in some implementations, the predetermined time period is determined based on the screen refresh rate of the display of the client device. For example, the predetermined time period can be selected to be greater than the screen refresh rate such that human perception can process the changes in data in a meaningful way. The aggregation worker thread 159b can buffer the processed data in the memory 155, or in a separate buffer space. As also described previously, in some implementations, the data is buffered with a delay of the predetermined time period either before triggering the aggregation worker thread, or after the data has been processed by the aggregation worker thread, but not both. In other implementations, the data is buffered with a delay both before triggering the aggregation worker thread and after the data has been processed by the aggregation worker thread.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
  receiving, at a client device, an input to present data corresponding to an application;
  in response to the input, displaying, using a web browser on the client device, a first user interface for the application;
  identifying a streaming data service corresponding to data to be displayed using the first user interface, the streaming data service being hosted by a server that is communicably coupled to the client device;
  subscribing, using a first web worker thread corresponding to the web browser, to the streaming data service;
  obtaining, using the first web worker thread from the server, new data corresponding to the streaming data service;
  providing the new data to a second web worker thread corresponding to the web browser;
  determining, by the second web worker thread, one or more differences between the new data and previously obtained data presented on the first user interface;

storing, by the second web worker thread, the one or more differences in a memory corresponding to the client device;

updating, by the second web worker thread, the first user interface using information stored in the memory, the information including the one or more differences;

receiving, at the client device, a second input requesting presentation of second data corresponding to the application;

in response to receiving the second input, displaying, using the web browser on the client device, a second user interface for the application;

determining a second streaming data service corresponding to the second data, the second streaming data service being hosted by a second server that is communicably coupled to the client device;

subscribing, using the first web worker thread, to the second streaming data service;

obtaining, using the first web worker thread from the second server, second data corresponding to the second streaming data service; and providing the second data to a third web worker thread corresponding to the web browser, wherein the third web worker thread is for processing the second data for presentation using the second user interface.

2. The method of claim 1, further comprising:

receiving, at the client device, a third input associated with a request to provide analytics data; and in response to receiving the third input:
performing, by the second web worker thread, one or more tasks corresponding to providing the analytics data; and
presenting, by the second web worker thread, results of the one or more tasks on the first user interface in conjunction with presenting data on the first user interface.

3. The method of claim 1, wherein displaying the first user interface for the application in response to receiving the input further comprises:

in response to receiving the input, executing at least one of the first web worker thread or the second web worker thread to process data for the first user interface.

4. The method of claim 1, wherein determining one or more differences between the new data and previously obtained data comprises:

determining the one or more differences using a data diffing tool.

5. The method of claim 4, wherein determining the one or more differences using a data diffing tool comprises:

determining the one or more differences using JavaScript Object Notation (JSON) data diff.

6. The method of claim 1, wherein updating the first user interface using information stored in the memory comprises:

transmitting a partial update to the first user interface, the partial update corresponding to the one or more differences.

7. The method of claim 1, wherein updating the first user interface by the second web worker thread further comprises:

determining status of a buffer time period for storing data for the client device; and upon expiration of the buffer time period:
executing the second web worker thread; and
updating, by the second web worker thread, the first user interface using the information, wherein the information is stored in the memory during the buffer time period.

8. The method of claim 7, further comprising selecting the buffer time period, including:

determining a screen refresh rate of a display screen corresponding to the client device; and in response to determining that a data refresh rate for updating data on the first user interface is slower than the screen refresh rate, selecting the buffer time period to correspond to the data refresh rate.

9. The method of claim 1, wherein processing the second data for presentation using the second user interface comprises:

determining, by the third web worker thread, one or more second differences between the second data and data previously presented on the second user interface;

storing, by the third web worker thread, the one or more differences in the memory corresponding to the client device;

determining status of a current buffer time period for storing data for the client device; and upon expiration of the current buffer time period, updating, by the third web worker thread, the second user interface using information stored in the memory during the current buffer time period, the information including the one or more second differences.

10. The method of claim 1, wherein displaying the second user interface for the application in response to the second input further comprises:

in response to the second input, executing the third web worker thread to process second data for the second user interface.

11. The method of claim 1, wherein the second server is the same as the server hosting the streaming data service corresponding to data to be displayed using the first user interface, and wherein the second streaming data service is the same as the streaming data service corresponding to data to be displayed using the first user interface.

12. One or more non-transitory media storing instructions that, when executed by one or more processors, cause the one or more processors to perform operations comprising:

receiving, at a client device, an input to present data corresponding to an application;

in response to the input, displaying, using a web browser on the client device, a first user interface for the application;

identifying a streaming data service corresponding to data to be displayed using the first user interface, the streaming data service being hosted by a server that is communicably coupled to the client device;

subscribing, using a first web worker thread corresponding to the web browser, to the streaming data service;

obtaining, using the first web worker thread from the server, new data corresponding to the streaming data service;

providing the new data to a second web worker thread corresponding to the web browser;

determining, by the second web worker thread, one or more differences between the new data and previously obtained data presented on the first user interface;

storing, by the second web worker thread, the one or more differences in a memory corresponding to the client device;

updating, by the second web worker thread, the first user interface using information stored in the memory, the information including the one or more differences receiving, at the client device, a second input requesting presentation of second data corresponding to the application;

in response to receiving the second input, displaying, using the web browser on the client device, a second user interface for the application;

determining a second streaming data service corresponding to the second data, the second streaming data service being hosted by a second server that is communicably coupled to the client device;

subscribing, using the first web worker thread, to the second streaming data service;

obtaining, using the first web worker thread from the second server, second data corresponding to the second streaming data service; and providing the second data to a third web worker thread corresponding to the web browser, wherein the third web worker thread is for processing the second data for presentation using the second user interface.

13. The one or more non-transitory media of claim 12, wherein the operations further comprise:

receiving, at the client device, a third input associated with a request to provide analytics data; and in response to receiving the third input:
performing, by the second web worker thread, one or more tasks corresponding to providing the analytics data; and
presenting, by the second web worker thread, results of the one or more tasks on the first user interface in conjunction with presenting data on the first user interface.

14. The one or more non-transitory media of claim 12, wherein displaying the first user interface for the application in response to receiving the input further comprises:

in response to receiving the input, executing at least one of the first web worker thread or the second web worker thread to process data for the first user interface.

15. The one or more non-transitory media of claim 12, wherein determining one or more differences between the new data and previously obtained data comprises:

determining the one or more differences using a data diffing tool.

16. The one or more non-transitory media of claim 12, wherein updating the first user interface by the second web worker thread further comprises:

determining status of a buffer time period for storing data for the client device, wherein the buffer time period is determined as a function of a screen refresh rate of a display screen corresponding to the client device; and upon expiration of the buffer time period:
executing the second web worker thread; and
updating, by the second web worker thread, the first user interface using the information, wherein the information is stored in the memory during the buffer time period.

17. The one or more non-transitory media of claim 12, wherein updating the first user interface using information stored in the memory comprises:

transmitting a partial update to the first user interface, the partial update corresponding to the one or more differences.

18. A system comprising:
one or more processors; and
one or more non-transitory media storing instructions that, when executed by the one or more processors, cause the one or more processors to perform operations comprising:

receiving, at a client device, an input to present data corresponding to an application;

in response to the input, displaying, using a web browser on the client device, a first user interface for the application;

identifying a streaming data service corresponding to data to be displayed using the first user interface, the streaming data service being hosted by a server that is communicably coupled to the client device;

subscribing, using a first web worker thread corresponding to the web browser, to the streaming data service;

obtaining, using the first web worker thread from the server, new data corresponding to the streaming data service;

providing the new data to a second web worker thread corresponding to the web browser;

determining, by the second web worker thread, one or more differences between the new data and previously obtained data presented on the first user interface;

storing, by the second web worker thread, the one or more differences in a memory corresponding to the client device;

updating, by the second web worker thread, the first user interface using information stored in the memory, the information including the one or more differences;

receiving, at the client device, a second input requesting presentation of second data corresponding to the application;

in response to receiving the second input, displaying, using the web browser on the client device, a second user interface for the application;

determining a second streaming data service corresponding to the second data, the second streaming data service being hosted by a second server that is communicably coupled to the client device;

subscribing, using the first web worker thread, to the second streaming data service;

obtaining, using the first web worker thread from the second server, second data corresponding to the second streaming data service; and providing the second data to a third web worker thread corresponding to the web browser, wherein the third web worker thread is for processing the second data for presentation using the second user interface.

19. The system of claim 18, wherein the operations further comprise:

receiving, at the client device, a third input associated with a request to provide analytics data; and in response to receiving the third input:
performing, by the second web worker thread, one or more tasks corresponding to providing the analytics data; and
presenting, by the second web worker thread, results of the one or more tasks on the first user interface in conjunction with presenting data on the first user interface.

20. The system of claim 18, wherein determining one or more differences between the new data and previously obtained data comprises:

determining the one or more differences using a data diffing tool.

* * * * *

UNITED STATES PATENT AND TRADEMARK OFFICE
CERTIFICATE OF CORRECTION

PATENT NO. : 11,055,113 B1  
APPLICATION NO. : 16/801418  
DATED : July 6, 2021  
INVENTOR(S) : Scarfutti et al.

Page 1 of 1

It is certified that error appears in the above-identified patent and that said Letters Patent is hereby corrected as shown below:

On the Title Page

Column 2, Line 5, under item (56) Other Publications, please replace "tableviews," with -- table views --.

Column 2, Line 7, under item (56) Other Publications, please replace "WorkersThe" with -- Workers The --.

Column 2, Line 9, under item (56) Other Publications, please replace "Diffingin" with -- Diffing in --.

In the Claims

In Column 20, Line 67, Claim 12, please delete "differences" and insert -- differences; --.

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*